Aug. 12, 1930. J. B. CRESCIO 1,773,031
WAFER MACHINE
Filed Oct. 3, 1927 3 Sheets-Sheet 1
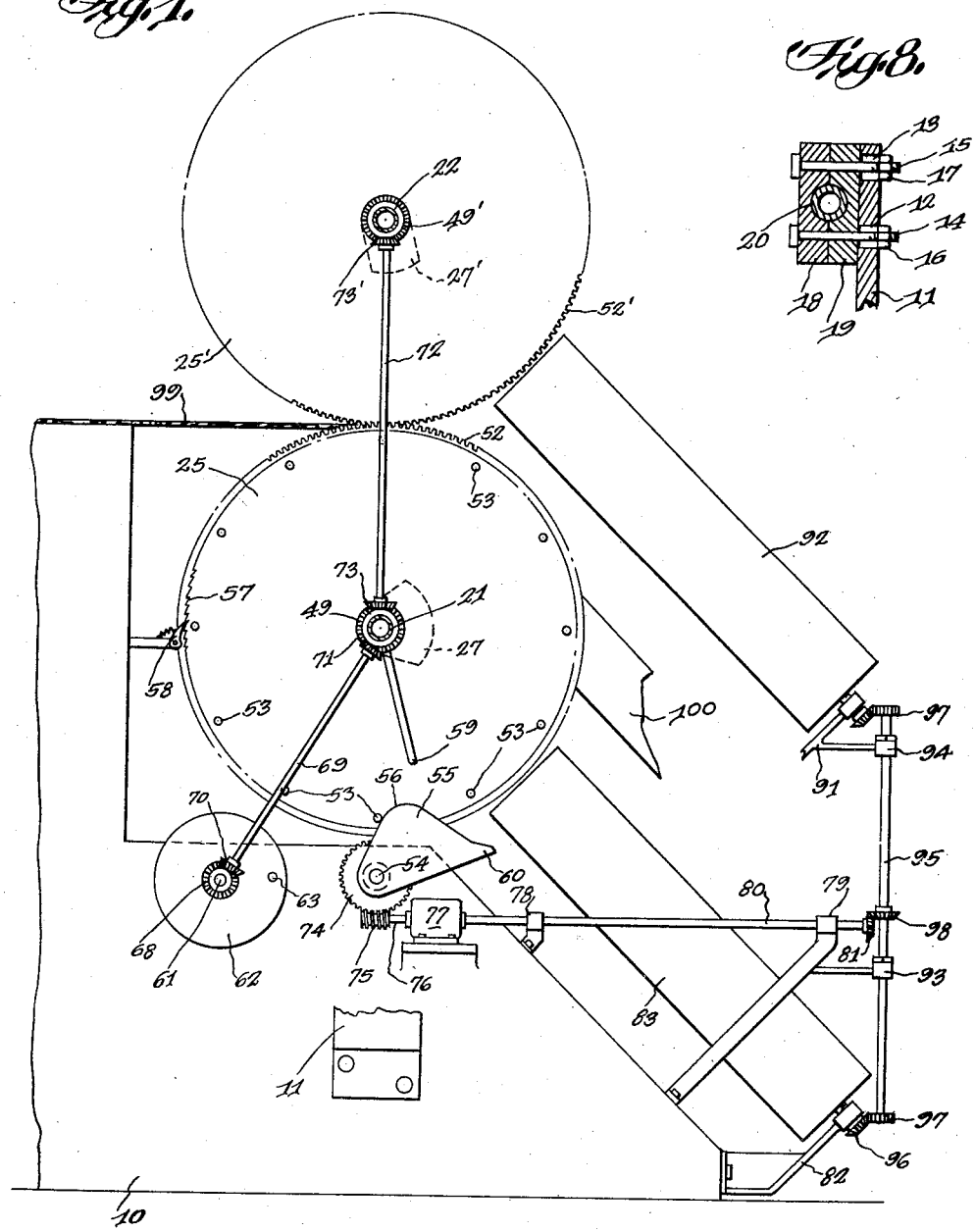
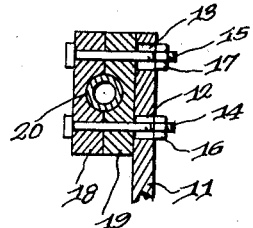
John B. Crescio INVENTOR
BY Victor J. Evans ATTORNEY

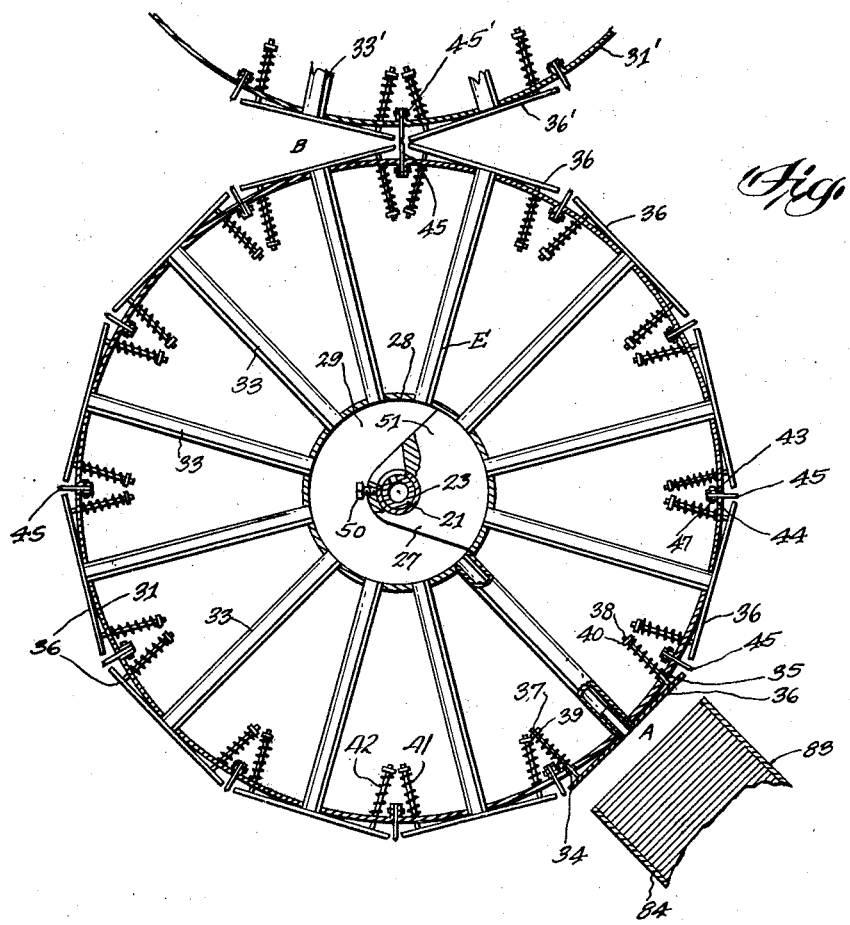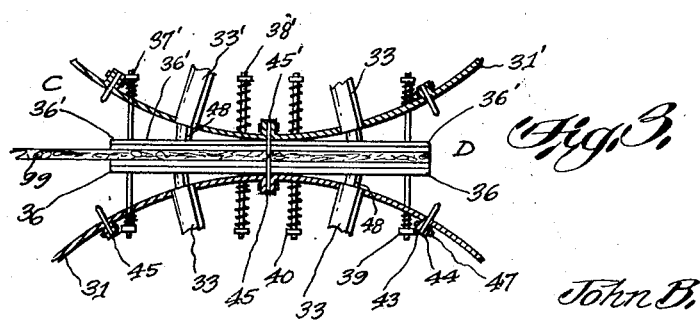

Aug. 12, 1930.  J. B. CRESCIO  1,773,031
WAFER MACHINE
Filed Oct. 3, 1927  3 Sheets-Sheet 3
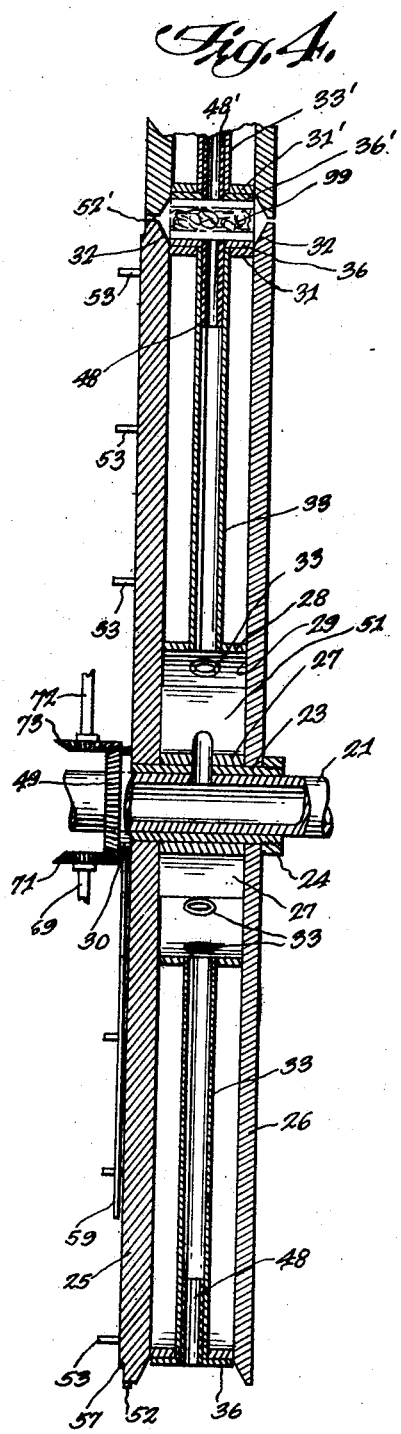
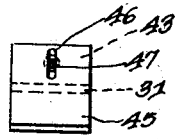
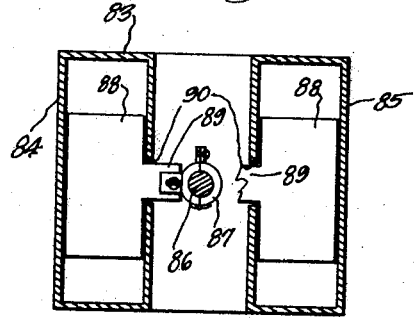
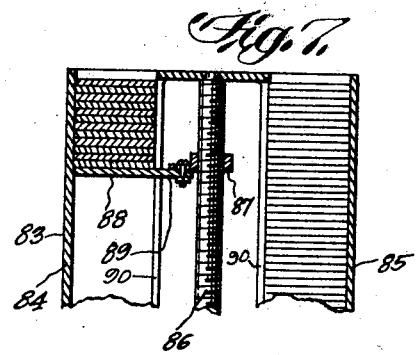
John B. Crescio
INVENTOR
BY Victor J. Evans
ATTORNEY Patented Aug. 12, 1930

1,773,031

UNITED STATES PATENT OFFICE

JOHN B. CRESCIO, OF CHICAGO, ILLINOIS

WAFER MACHINE

Application filed October 3, 1927. Serial No. 223,755.

This invention relates to certain novel improvements in wafer machines and particularly relates to a machine for placing cake like wafers over a candy like filling so as to form a so-called sandwich.

The salient object of my invention is to provide a machine which will place cake like wafers on a candy filling so as to form a confection which may be, if so desired, coated with a candy covering.

An object, ancillary to the foregoing, is to provide a machine which will include two cooperating annular members arranged for simultaneous movement.

Another object of the invention is to provide two annular members so arranged that portions of their periphery will roll on one another.

Another object of the invention, ancillary to the foregoing, is to so arrange the members that wafers may be carried on their peripheries and to so position the mechanisms that the wafers will be deposited on a filling material at substantially the point of contact.

A further object of the invention is to so arrange the device that the wafers will be held on the periphery of the members until a predetermined time.

A further object of the invention is to provide means on the members for severing the filling material after it has been inserted between the wafers.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a preferred embodiment of my invention in which certain parts have been broken away;

Fig. 2 is a transverse sectional view of a portion of the device;

Fig. 3 is an enlarged detail view depicting the manner in which the wafers are placed upon the filling and the manner in which the filling is severed.

Fig. 4 is a longitudinal sectional view of one of the cooperating members;

Fig. 5 is a detail view of a cutting mechanism employed in the device;

Fig. 6 is a transverse sectional view of the structure employed in supplying wafers to the device;

Fig. 7 is a longitudinal sectional view of the mechanisms depicted in Fig. 6; and Fig. 8 is a sectional detail view of a bearing structure employed in the mechanism.

Referring to the drawings wherein the preferred embodiment of my invention is illustrated, it may be seen that I provide a suitable supporting structure 10 on which brackets 11 are suitably secured. The brackets 11 extend upwardly and at suitable points thereon bearing structures are mounted. In Fig. 8 it may be seen that slots 12 and 13 are provided in the bracket 11. Bolts 14 and 15 extend through the slots 12 and 13 and have nuts 16 and 17 thereon. The bolts 14 and 15 serve to clamp the bearing plates 18 and 19 to the bracket 11 and a suitable bearing 20 is retained between these plates. By shifting the bolts 14 and 15 relative to the extent of the slots 12 and 13 the height of the bearings 20 may be adjusted.

The bearings 20 are suitably located along the brackets 11 and support spaced apart shafts 21 and 22. The shafts 21 and 22 are preferably hollow for a purpose to be brought forth hereinafter. As is best shown in Fig. 4 a bearing sleeve 23 is disposed around the shaft 21. Rotatably mounted on the bearing sleeve 23 is the annular disk 25. An annular disk 26 is also rotatably mounted on the sleeve 23 and a spacing member 27 is mounted therebetween. Spaced away from the spacing member 27 is a ring 28 that is secured to the inner walls of the disks 25 and 26 to define an air tight chamber 29. Disposed in engagement with the outer surface of the annular disk 25 a shoulder formation 30 is provided on the sleeve 23. A nut 24 is mounted on the opposite screw threaded end of the sleeve 23 and engages the outer surface of the disk 26 and this structure serves to securely lock the foregoing structures in position on the shaft 21.

Disposed between the disks 25 and 26 adjacent the outer edges thereof is a ring 31. The ring 31 is spaced inwardly from the edges of the disks as is best shown in Fig. 4 and the inner surfaces of the disks are beveled as indicated at 32 for a purpose to be brought forth hereinafter. Disposed to extend between the rings 28 and 31 are a plurality of conduits 33, formed, if desired, of flexible material.

A plurality of openings are provided in the ring 31, such as the openings 34 and 35, which, as can be seen by referring to Fig. 2, are equidistantly spaced from one of the conduits 33. Plates 36 are mounted to engage the outer surface of the ring 31 adjacent the points at which the conduits 33 enter said ring. The plates 36 are arranged tangent to the ring 31 at these points. Pins 37 and 38 extend through the openings 34 and 35 and are secured to the plates 36 adjacent the ends thereof. Collars 39 and 40 are provided on the pins 37 and 38 and coil springs 41 and 42 are disposed around the pins 37 and 38 to extend between the collars 39 and 40 and the inner surface of the ring 31. Thus the plates 36 are mounted so as to be rockable about their point of tangency with the ring 31. On the ring 31 between the edges of adjacent plates 36 are ears 43 and 44. In the present instance the ring 31 is comprised of a plurality of segmental sections which are secured together by bolts extending through the ears 43 and 44 although other analogous constructions might be used in place of this. Disposed between the ears 43 and 44 are blades 45 which as can be seen by referring to Fig. 5 have a slot 46 formed therein through which the bolt 47 extends and this bolt 47 also serves to secure the ears. It is apparent that this mounting permits the blade 45 to be shifted inwardly and outwardly for a purpose to be brought forth hereinafter.

The conduits 33 open into the chamber 29 and also extend through the ring 31. Flexible connectors 48 extend into the conduits 33 and through the plates 36 for a purpose to be brought forth hereinafter.

As is shown best in Figs. 1 and 4 a bevel gear 49 is secured to the flange 30 in any desired manner. As is shown best in Fig. 2 the spacer 27 is secured to the sleeve 23 by set screw 50 and the spacer 27 includes a portion 51 which engages the inner surface of the ring 28. A portion 51 is disposed to close communication to certain of the conduits 33 for a purpose to be described hereinafter. It is apparent that movement of the gear 49 will cause the spacer 27 to be shifted relative to the ring 28.

The periphery of the disk 25 is arranged to embody gear teeth 52. The preferred form of construction contemplates utilizing two such structures and a cooperating structure includes a disk 25' which also has gear teeth 52' formed on the periphery thereof and through the medium of these gear teeth the two structures are caused to revolve together in opposite directions. On the surface of the disk 25 a plurality of pins 53 are provided. A shaft 54 is suitably carried by the supporting structure 10 and has a cam 55 mounted thereon which has a cam surface 56 that engages the pins 53 as the shaft 54 is rotated in a manner to be described hereinafter to cause the disks 25 and 25' to be motivated. As the shaft 54 turns the cam surface 56 rides against one of the pins 53 and advances the structures a predetermined amount. A ratchet 57 is provided on the disk 25 and the spring urged pawl 58 engages this ratchet to prevent movement of the disk 25 in a direction opposite to that in which it is propelled by the cam 55. Extending downwardly over the surface of disk 25 and secured to the shoulder 30 is a rod 59 which is engaged by the projection 60 on the cam 55 at a predetermined time in order to alter the position of the portion 51 of the member 27.

A shaft 61 is suitably carried by the supporting structure 10 and an annular disk 62 is mounted thereon. A pin 63 is provided on the surface of disk 62 and this pin is engaged by the projection 60 during a period of the travel thereof. A bevel gear 68 is provided on the shaft 61 and a shaft 69 extends between the bevel gear 68 and the bevel gear 49.

The shaft 69 is supported from the bracket 11 in any desired manner (not shown). A bevel gear 70 is carried by the shaft 69 which meshes with the bevel gear 68 and a bevel gear 71 meshes with the bevel gear 49. When the projection 60 strikes the pin 63, disk 62 will be moved as well as shaft 61, and therefore bevel gears 68, 70, 71, and 49 to move the portion 51 of member 27 in a direction opposite to that in which it is moved when the arm 59 is motivated. A shaft 72 extends between the bevel gear 49 and the bevel gear 49' and carries at one end the bevel gear 73 that meshes with the bevel gear 49 and at the opposite end it carries a bevel gear 73' that meshes with the bevel gear 49. Thus any movement imparted to the sleeve 23 will also be imparted to the sleeve 23' of the co-operating structure.

A gear 74 is mounted on the shaft 54 and meshes with a worm gear 75 that is carried by the motor shaft 76 of motor 77 which is supported from the structure 10 in any desired manner. Bearings 78 and 79 are carried by the supporting structure 10 and a shaft 80 is journaled therein which if desired may be an extension of the motor shaft 76. A bevel gear 81 is carried at the outer end of shaft 80.

A bracket 82 is carried by the supporting structure 10 and supports the wafer container 83. As is shown best in Figs. 6 and 7 the wafer container 83 comprises two cartridge like portions 84 and 85. The bracket 82 is so disposed that the upper end of the cartridge 84 will be directed toward the periphery of the lower structure which includes the disk 25. When the container 84 has been emptied the device is arranged so that the cartridge 85 may be swung into position. Disposed between the cartridges 84 and 85 is a rotatable screw threaded shaft 86. A nut 87 is ridable therealong and a plate 88 carried in the cartridge 84 and having a tongue 89 extending through the slot 90 in the cartridge wall is suitably secured to the nut 87. The nut 87 is arranged in two pieces to be separable in order that it may be disengaged from the shaft 86. A similar structure is provided in the cartridge 85 and only one of these devices is used at one time. When the cartridge 84 is in alignment with the periphery of the disk, as described, the nut which motivates the plate 88 in cartridge 84 is connected to ride on the shaft 87 and the nut which motivates the plate 88 in cartridge 85 is disconnected. A bracket 91 is carried by the supporting structure 10 and this bracket supports a similar cartridge structure 90 which is arranged to open near the periphery of the upper member. Bearings 93 and 94 are provided and a shaft 95 is journaled therein. Bevel gears 96 are provided on the lower end of the shafts 86 of the cartridge structures and gears 97 mesh therewith. A gear 98 is provided on the shaft 95 which meshes with the bevel gear 81 to motivate the shaft 95 and therefore the shafts 86.

In operation a suitable air exhausting means (not shown) is connected to the hollow shafts 21 and 22 to evacuate the chambers 29 and 29'. This creates a suction in the conduits 33 which is utilized in the following manner. The cartridge structures 84 and 85 are filled with cake like wafers or analogous material and the suction in the conduit 33 in the position A of Fig. 2 will draw a wafer from the cartridge in alignment therewith. The motor 77 will be operating and therefore the cam 55 will be motivated and this will advance both the structures a distance sufficient to bring the next conduit 33 into position A when another wafer will be picked up. It is apparent that the shafts 86 are rotating and therefore moving the nuts 87 upwardly and therefore the plates 88 and thus since this action occurs in a predetermined ratio, the wafers in the container are fed upwardly so that they may be easily lifted by the suction in the conduits 33.

The foregoing operation is continued until the wafers held in engagement with the plates 36 will reach the position B. A suitable filling material, generally indicated in the drawings by 99, is fed toward the contacting point of the two members in any desired manner to pass therebetween. It is apparent that when the wafers reach the point B they will engage the filling 99 and therefore when the cam 55 functions to move the device forwardly the wafers which are backed up between plates 36 will cause the plates 36 to pivot and move until position C is reached (Fig. 3). It is apparent that the wafers are then in engagement with the filling 99. At this same time the cutting blades 45 and 45' move into position to sever the filling 99 adjacent the edges of the wafers. After this action the wafers move to the position D and it is apparent that at this time it is desirable that the suction be released so that the wafer may fall into the discharge receiver 100 which is positioned as is best shown in Fig. 1. This is accomplished in the following manner.

As movement is continued from the position "D" the conduits 30 directed toward the devices in this location move into a position so that passage therethrough is prevented by the member 51. This obviously shuts off the suction to these conduits and, therefore, the wafers which will be adhered to the material 99 will be free to fall into the discharge receiver 100.

As the cam 55 successively acts on the pins 53 the projection 60 thereon will engage the outer end of the arm 59. It has been pointed out that this arm 59 is connected to the member 51, and, therefore, when the projection 60 engages the arm 59 and moves the same in a clockwise direction the member 51 will be moved into a position so that passage through the conduit extending toward the position "A" will be prevented. As the cam 55 continues to move it will engage the pin 63 and will act in a manner set forth hereintofore to move the member 51 into the position illustrated in Fig. 2 which permits passage through the conduit extending toward the conduit "A." By reason of this arrangement a wafer will not be picked up from the supplying source until the conduit and receiving plate are in proper position and this arrangement will prevent one end of the wafer being reached before the other end and other detrimental acts which might cause breakage of the wafers.

I have found it preferable to size the filling, that is coat it with an adhesive substance, so that cakes will be firmly held thereon. If desired the cakes may also be so coated. Further, the cakes may be coated after being picked up and the filling may be omitted. The substance used to coat the cakes in this instance would be applied to produce an appreciable layer on the cakes. The mechanism employed to accomplish the foregoing may be constructed in a number of different ways and I therefore have not depicted it. The bevels 32 aid in properly positioning the wafers as they are fitted together.

It is apparent from the foregoing that I have provided a construction in which wafers may be expeditiously and rapidly applied to a suitable filling material.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A device of the class described including two annular members adapted to roll together, suction means for holding wafers on the periphery of said members, means for inserting a material between said members and the wafers thereon, and means for severing said filling material adjacent the ends of said wafers after said material has been inserted between said wafers.

2. A device of the class described including two annular members adapted to roll together, suction means for holding wafers on the periphery of said members, means for inserting a material between said members and the wafers thereon, means for severing said filling material adjacent the ends of said wafers after said material has been inserted between said wafers, and means for shutting off said suction to permit releasing of said wafers after the severance of said filling material.

3. A device of the class described including means for supporting two shafts in spaced relation, spaced apart disks on said shafts, means on certain of said disks for interconnecting said disks for simultaneous movement, means for imparting a step-by-step movement to said disks, spaced apart rings disposed between said disks around said shafts, certain of said rings defining chambers between said disks around said shafts, conduits extending between the chambers around said shafts between said disks and the outer of the rings, a delivery point, and means for closing communication through the conduits extending toward said delivery point.

4. A device of the class described including means for supporting two shafts in spaced relation, spaced apart disks on said shafts, means on certain of said disks for interconnecting said disks for simultaneous movement, means for imparting a step-by-step movement to said disks, spaced apart rings disposed between said disks around said shafts, certain of said rings defining chambers between said disks around said shafts, conduits extending between the chambers around said shafts between said disks and the outer of the rings, a delivery point, means for closing communication through the conduits extending toward said delivery point, and means for shifting said last mentioned means at predetermined times.

5. A device of the class described including means for supporting two shafts in spaced relation, spaced apart disks on said shafts, means on certain of said disks for interconnecting said disks for simultaneous movement, means for imparting a step-by-step movement to said disks, spaced apart rings disposed between said disks around said shafts, certain of said rings defining chambers between said disks around said shafts, conduits extending between the chambers around said shafts between said disks and outer rings, yieldably mounted plates positioned tangent to said outer rings over the ends of said conduits, yieldable conduits opening through said plates and extending into said conduits, and shiftable means in said chambers controlling communication to said conduits.

6. A device of the class described including members adapted to be rolled together with a step-by-step movement, suction operated means for supporting a plurality of wafers on the edges of said members, and means for supplying said wafers to said members, said suction operated means being adapted to withdraw wafers from said supplying means.

7. A device of the class described including two annular members adapted to roll together shafts for supporting said members, suction operated means for holding wafers on the periphery of said members, means for controlling operation of said suction operated means to permit releasing of said wafers from said members, and means for supporting said shafts for movement toward and away from each other.

In testimony whereof I affix my signature.

JOHN B. CRESCIO.